US007516231B2

(12) United States Patent
Langer et al.

(10) Patent No.: US 7,516,231 B2
(45) Date of Patent: Apr. 7, 2009

(54) SUBSCRIBER-SIDE UNIT ARRANGEMENT FOR DATA TRANSFER SERVICES AND ASSOCIATED COMPONENTS

(75) Inventors: Eric Langer, Erftstadt (DE); Volker Lügger, Fröndenberg (DE)

(73) Assignee: Siemens Aktiengesellschaft, Munich (DE)

( * ) Notice: Subject to any disclaimer, the term of this patent is extended or adjusted under 35 U.S.C. 154(b) by 612 days.

(21) Appl. No.: 10/526,270

(22) PCT Filed: Aug. 12, 2003

(86) PCT No.: PCT/DE03/02717

§ 371 (c)(1),
(2), (4) Date: Mar. 2, 2005

(87) PCT Pub. No.: WO2004/025919

PCT Pub. Date: Mar. 25, 2004

(65) Prior Publication Data

US 2006/0064423 A1    Mar. 23, 2006

(30) Foreign Application Priority Data

Sep. 4, 2002  (DE) .............................. 102 40 899

(51) Int. Cl.
*G06F 15/16* (2006.01)
(52) U.S. Cl. .................. 709/231; 709/232; 709/237
(58) Field of Classification Search ............... 709/231, 709/232, 237
See application file for complete search history.

(56) References Cited

U.S. PATENT DOCUMENTS

| | | | | |
|---|---|---|---|---|
| 5,659,683 A * | 8/1997 | Kawano et al. | ............... | 707/10 |
| 5,761,469 A * | 6/1998 | Greenley | ..................... | 712/210 |
| 6,163,536 A | 12/2000 | Dunn et al. | .................. | 379/309 |
| 6,456,036 B1 * | 9/2002 | Thandiwe | ................... | 320/106 |
| 6,507,590 B1 * | 1/2003 | Terho et al. | .................. | 370/466 |
| 6,584,093 B1 * | 6/2003 | Salama et al. | ............... | 370/351 |
| 6,771,636 B1 * | 8/2004 | Feyaerts | ..................... | 370/352 |
| 6,895,410 B2 * | 5/2005 | Ridge | ...................... | 707/104.1 |
| 6,912,225 B1 * | 6/2005 | Kohzuki et al. | ............. | 370/412 |
| 6,934,756 B2 * | 8/2005 | Maes | ......................... | 709/227 |
| 6,981,029 B1 * | 12/2005 | Menditto et al. | ............ | 709/217 |
| 7,058,356 B2 * | 6/2006 | Slotznick | .................... | 455/3.05 |
| 7,366,660 B2 * | 4/2008 | Kondo et al. | ................. | 704/219 |
| 2004/0205159 A1 * | 10/2004 | Johnson et al. | ............. | 709/218 |
| 2007/0150215 A1 * | 6/2007 | Spitaels et al. | ................ | 702/61 |

FOREIGN PATENT DOCUMENTS

EP    1 143 683 A2    10/2001

(Continued)

OTHER PUBLICATIONS

Chelston Call Systems, "VOIP PCI H.323 Gateway", Internet, Online, May 2000, XP002264151, Retrieved from the Internet: <URL:www.chelston.co.uk/welcome/pages/technology/voice-Over-IP.htm>, Retrieved Dec. 4, 2003, pp. 1-7.

(Continued)

*Primary Examiner*—Patrice Winder
*Assistant Examiner*—Thomas Duong

(57) ABSTRACT

The invention relates to, inter alia, an unit arrangement containing a network personal computer and a portable unit which are both used to provide the same data transfer service. By dividing the functional units between two units, a constantly high speech quality is guaranteed during the transfer of speech data.

16 Claims, 2 Drawing Sheets

FOREIGN PATENT DOCUMENTS

WO        WO 01/84798 A2    11/2001

OTHER PUBLICATIONS

Ismail Dalgic, and Hanlin Fang, "Comparison of H.323 and SIP for IP Telephony Signaling", Proceedings of the SPIE Conference on Multimedia Systems and Applications II, Boston, Massachusetts, Sep. 1999, SPIE vol. 3845, pp. 106-122, XP000949839.

R. Gopalakrishnan and Andreas D. Bovopoulos, "A Protocol Processing Architecture for Networked Multimedia Computers", Jul. 1993, Operating Systems Review, ACM Headquarters, New York, US, vol. 27, No. 3, pp. 19-33, XP000384241.

* cited by examiner

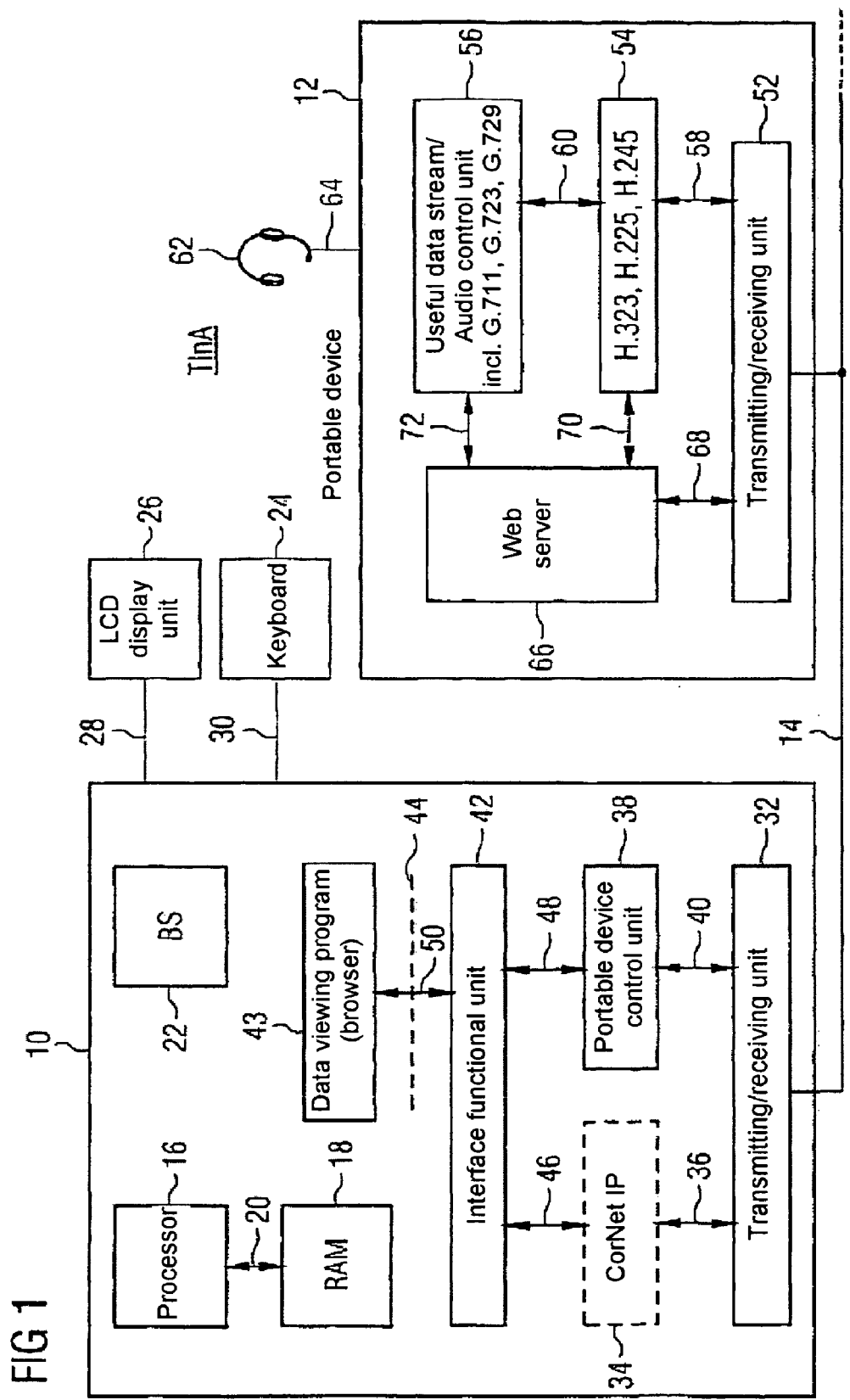

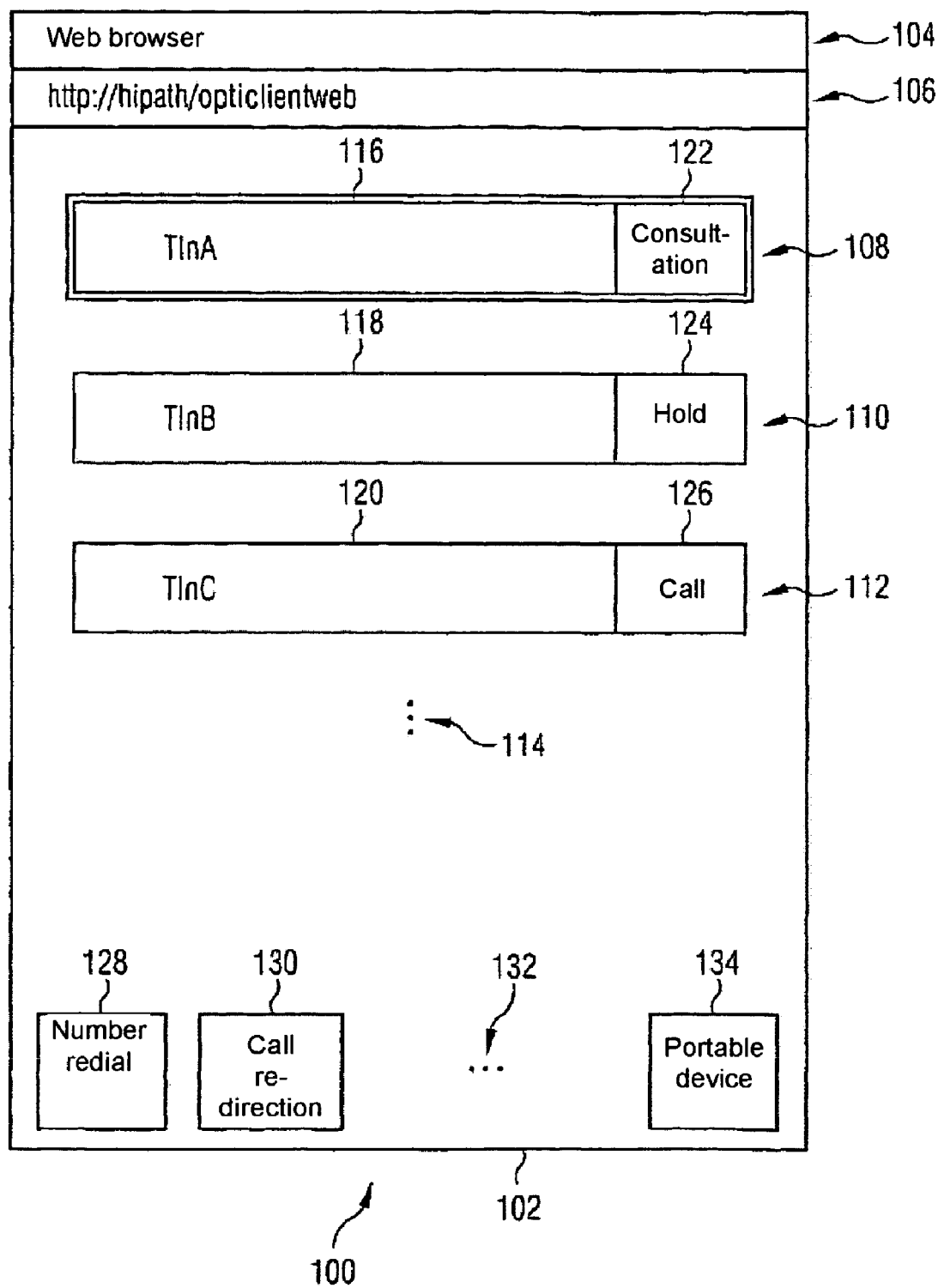

SUBSCRIBER-SIDE UNIT ARRANGEMENT FOR DATA TRANSFER SERVICES AND ASSOCIATED COMPONENTS

CROSS REFERENCE TO RELATED APPLICATIONS

This application is the US National Stage of International Application No. PCT/DE03/02717, filed Aug. 12, 2003 and claims the benefit thereof. The International Application claims the benefits of German application No. 10240899.8 DE filed Sep. 4, 2002, both of the applications are incorporated by reference herein in their entirety.

FIELD OF INVENTION

The invention relates to a user-side device arrangement containing a service usage computer, which is to say what is termed a client. Said service usage computer contains at least one storage unit in which program instructions are or can be stored. Said service usage computer furthermore contains at least one processor which executes the stored program instructions. When said program instructions are executed, the functions of, for example, a signaling unit are provided whose signaling function enables the use of additional features of the data transfer service. The user-side device arrangement furthermore contains a useful-data processing unit that processes useful data transferred within the scope of the data transfer service.

BACKGROUND OF INVENTION

The functions of said useful-data processing unit can also be provided by the service usage computer. In this case the processor of the service usage computer program processes instructions during whose execution the functions of the useful-data processing unit are provided.

The data transfer service relates, for example, to:
the transmission of voice data within the scope of a telephone connection, or
the transmission of video data within the scope of a videoconference.

Typical functions of the signaling unit relate to providing additional features, in particular for users whose terminals are operated on a private branch exchange.

Typical functions of the useful-data processing unit are:
analog-to-digital conversion or, as the case may be, a digital-to-analog conversion, and
voice data compressing.

While at upper protocol levels there are connections for transmitting the useful data, when data packets are transmitted in a data packet transmission network, transmission of the data packets at lower protocol levels is connectionless. Signaling for transmission of the useful data has, for example, been established:
for internet protocol telephone services in the protocols of the H.323 protocol family of the ITU-T (International Telecommunication Union-Telecommunication Standardization Sector), in particular in the H.225 and H.245 protocols,
for internet protocol telephone services in the SIP (Session Initiation Protocol) signaling protocol of the IETF (International Engineering Task Force).

SUMMARY OF INVENTION

The object of the invention is to disclose an improved device arrangement for data transfer services, which arrangement in particular ensures a consistently high data transmission quality and in particular operates as far as possible independently of a specific operating system of the service usage computer. Further to be disclosed are an associated supplementary unit, an associated service providing computer, an associated method, and an associated program.

The object with reference to the device arrangement is achieved by means of a device arrangement having the features indicated in the claims.

The invention proceeds from the consideration that using a service usage computer having a signaling unit and a useful-data processing unit entails a large number of disadvantages:
as an instance, even the data transfer service's basic function, which is to say the mere transferring of useful data between two users, in particular the call answering process or, as the case may be, call setup process associated therewith, can only be used when the service usage computer has been activated or, as the case may be, when the service usage computer is operable, but not, for example, when the service usage computer has been deactivated or if the service usage computer is faulty,
although very powerful processors are available, there are always applications that require all the processor's power. The processing of useful data being a highly compute-intensive operation, speech quality is impaired when a powerful application and the processing of useful data are executed simultaneously by one and the same processor,
the useful-data processing unit in a service usage computer contains, inter alia, what is termed a sound card requiring to be installed as a function of the operating system and as a function of the type of said card. There are, for example, several hundred different types of sound cards. The effort involved in installing the sound cards is considerable.

In the device arrangement according to the invention the signaling unit and the useful-data processing unit are therefore divided between two different devices. The signaling unit continues to be located in the service usage computer. However, the functions of the useful-data processing unit are provided by means of a supplementary unit containing an additional storage unit for storing the useful data and an additional processing unit, for example an additional processor or an electronic circuit operating without a processor.

As a result of this measure the supplementary unit is able to operate substantially independently of the service usage computer's operating system. One type of supplementary unit can therefore be used for different operating systems. The device arrangement according to the invention results, moreover, in the speech quality's being independent of the loading of the processor in the service usage computer by another application; this is because the speech quality is substantially determined by the useful-data processing unit, which operates substantially independently of the service usage computer.

The device arrangement according to the invention further offers the possibility of substantially reducing the service usage computer's power. It means that all that is required is what is termed a network computer, which is to say a computer which, compared to a computer that can be operated independently of a data transmission network, is a reduced, more economical computer generally not containing any read-only memories for very large volumes of data as is the case with hard disks.

In a development of the device arrangement the service usage computer contains an operating system program providing basic functions for operating the service usage computer, for example the WINDOWS NT operating system.

Said basic functions relate, for example, to administering the memory or to inputting/outputting data on a monitor. In the development the supplementary unit contains an additional operating system program providing basic functions for operating the supplementary unit. Firmware is also referred to in connection with the supplementary unit's operating system because the functions, in particular the form of functional calls, of said operating system do not have to be or, as the case may be, are not notified to the user of the access unit. In an alternative development the supplementary unit contains a circuit whose basic functions are provided without the involvement of an operating system program, which is to say, for example, a circuit not containing a processor.

In another development the supplementary unit is located in its own housing outside the service usage computer. The supplementary unit in particular contains its own power supply unit operating independently of a power pack of the service usage computer. The supplementary unit is alternatively connected to, for instance, a power supply for devices operating on a data transmission network. The supplementary unit can, to particular practical advantage, be accommodated in a handset so that a device that is in any event present on the service user's desk is used.

In another development the supplementary unit will also provide basic functions of the data transfer service when the service usage computer has been deactivated. For example what is termed a hookswitch function is contained in the supplementary unit. Said hookswitch function makes it possible to signal a connection request from the service user to, for instance, a permanently defined terminal in a simple manner to a service providing computer, or to answer a call.

In a further development of the device arrangement the service usage computer and supplementary unit each contain a transmitting/receiving unit connected to a data packet transmission network. In a development, said data transmission network is a data transmission network operating according to the Internet Protocol.

The data transmission network operating, for instance, according to the Internet Protocol is in another development used to configure the supplementary unit from the service usage computer with the aid of a setting unit. Said setting unit exchanges control data with the service usage computer's transmitting/receiving unit, which in turn forwards the control data to the supplementary unit or which has previously received said control data from the supplementary unit. As a result of this measure, no additional interface such as, for example, a V.24 interface or a USB (Universal Serial Bus) interface or an infrared interface is required to the data transmission network between the service usage computer and the supplementary unit.

The transmitting/receiving unit of the supplementary unit is in another development used also for transmitting the useful data within the scope of the data transfer service so as to have a double function. In the service providing computer the transmitting/receiving unit is, in a development, used outside the data transfer service for which the supplementary unit is provided for transmitting useful data in data packets. The transmitting/receiving unit of the service usage computer thus also has a double function.

In a further development the signaling unit in the service usage computer provides the functions of an interface that have been specified for users connected to a private branch exchange, for example the UP0 interface of the Central Association of German Electrical Engineers. Many in-house interfaces between user terminals and a private branch exchange that have been defined within corporations are based on said interface, for example on the CorNet interface, the CorNet TS interface, or the CorNet IP (Internet Protocol) interface of the company SIEMENS AG.

Input/output devices that are in any event present on the service usage computer are required for configuring the supplementary unit and for operating the signaling unit. These functions can consequently be carried out in a very user-friendly manner entailing no additional equipment-related expenditure requirements. In particular, the supplementary device does not have to contain a keyboard or monitor, or connection terminals for units of this type.

In a further development the signaling unit and setting unit each contain an interface to a data viewing program, which is to say to what is termed a browser. A program present in any event on the service usage computer, in particular in the case of a network computer, is hence used in the device arrangement according to the invention in particular for configuring the supplementary unit, but also for displaying signaling statuses.

In another development the supplementary unit is located between the service usage computer and the data transmission network, for example between the service usage computer and what is termed a hub. The supplementary unit contains a load controlling unit that registers cases of overload in the data transmission network. There will be a case of overload when it can no longer be ensured, unless additional measures are taken, that the voice data will be transmitted with a high level of speech quality. When a case of overload is registered, the useful-data packets coming from the supplementary unit and/or addressed to the supplementary unit will be forwarded having priority over the data packets coming from the service usage computer or addressed to the service usage computer. Through this measure a high level of speech quality can also be ensured when there is a threat of overload.

The invention furthermore relates to a supplementary unit and a service providing computer which are employed in particular in the device arrangement according to the invention or in one of the developments thereof. The invention further relates to a method and a program which are suitable for operating the devices in said device arrangement. The above-cited technical effects thus also apply to the supplementary unit, the method, and the program.

BRIEF DESCRIPTION OF THE DRAWINGS

Developments of the invention and exemplary embodiments are explained below with the aid of the figures.

FIG. 1 shows a network personal computer and a portable device for internet protocol telephony, and FIG. 2 shows a monitor display for the user using the portable device.

DETAILED DESCRIPTION OF INVENTION

FIG. 1 shows a network personal computer 10 and a portable device 12 both serving to provide the internet protocol telephony service for a user TlnA connected to a private branch exchange (not shown). The private branch exchange offers a number of additional features compared to a connection to a public switching center. The connection between the private branch exchange and the network personal computer 10 or, as the case may be, the portable device 12 is set up over an in-house data transmission network 14 operating according to, for example, the Internet Protocol. The data transmission network 14 is referred to also as a LAN (Local Area Network). The functions of the private branch exchange and the functions of a service providing computer for the "internet telephony" service are performed by, for example, a computer having particular hardware or by a computer having a suitable program. The HiPath 3000 and HiPath 4000 systems from the company SIEMENS AG are instances of the first possibility. With the HiPath 5000 system a computer without any special hardware, having only a suitable program, can be used as the service providing computer for the internet telephony service and as the private branch exchange. The service providing computer is referred to also as a server or, in the "H.323 world", as a network access unit or a gatekeeper. Service providing computers and private branch exchanges from other companies can, of course, also be used.

The personal computer 10 contains a processor 16 and a storage unit 18 which does not store any data when the personal computer 10 is deactivated. The processor 16 executes program instructions of application programs loaded into the storage unit 18 when the personal computer 10 has been activated. Accessing of the storage unit 18 by the processor 16 is shown by means of an arrow 20.

The personal computer 10 contains in, for example, a ROM (Read Only Memory) an operating system 22 providing basic functions required to ensure the functioning capability of the personal computer 10. The operating system 22 performs, for instance, functions with the aid of which characters can be entered into the personal computer 10 via a keyboard 24. With the aid of another function of the operating system 22, characters are shown on a monitor 26 connected to the personal computer 10 via a lead 28. The keyboard 24 is connected to the personal computer 10 via a lead 30.

The functions of the units, explained below, of the personal computer 10 are provided with the aid of the programs in the storage unit 18 or with the aid of the operating system 22. A transmitting/receiving unit 32 of the personal computer 10 serves to receive data packets coming from the data transmission network 14 and to transmit data packets into the data transmission network 14. The transmitting/receiving unit 32 operates at a low protocol level, for example according to the TCP/IP (Transmission Control Protocol/Internet Protocol) internet protocol.

At a higher protocol level a user protocol unit 34 serves as the user-side termination of a signaling protocol between the personal computer 10 of a user TlnA that is connected as a part of a terminal to a private branch exchange and the private branch exchange. A protocol of this type is transmitted, for example, on a nationally specified UP0 interface. The user protocol unit 34 operates according to, for example, an in-house protocol, for example according to the CorNet protocol of the company SIEMENS AG. The user protocol unit 34 feeds out data requiring to be transmitted over the data transmission network 14 to the transmitting/receiving unit 32. Conversely, the transmitting/receiving unit 32 forwards signaling data received over the data transmission network 14 to the user protocol unit 34, see arrow 36.

A portable device control unit 38 serves to provide functions at the same protocol level as the user protocol unit 34. The portable device control unit 38 serves to configure the portable device 12. Control messages are forwarded from the portable device control unit 38 to the transmitting/receiving unit 32, which then transmits the messages to the portable device 12. Conversely, confirmation reports coming from the portable device 12 or reports containing setting values are forwarded by the transmitting/receiving unit 32 to the portable device control unit 38, see arrow 40.

An interface functional unit 42 forms the interface between the user protocol unit 34 and portable device control unit 38 on the one hand and a data viewing program 43 on the other. The interface functional unit 42 contains; for instance, what is termed an expansion program interface 44 (plug-in interface) to a program component of the data viewing program 43, with the aid of which component the capabilities of a conventional data viewing program 42 are expanded in a simple manner, for example what is termed an applet complied in the JAVA programming language. Said program component is transmitted for the user protocol unit 34 by a service providing computer for providing the functions of the private branch exchange and for the portable device control unit 38 by a service providing computer in the portable device 12. In the exemplary embodiment the service providing computer for providing the functions of the private branch exchange also provides the functions of a network access unit (gatekeeper) for accessing the data packet transmission network. Said functions are provided in another exemplary embodiment by two different service providing computers.

The interface functional unit 42 distributes the reports coming from the data viewing program 43 to the user protocol unit 34 or, as the case may be, to the portable device control unit 38. In the opposite direction, data coming from the user protocol unit 34 or, as the case may be, from the portable device control unit 38 is forwarded to the data viewing program 43, see arrows 46 to 50.

The data viewing program 42 is referred to also as a web browser. It is possible with the aid of the data viewing program 43 to access text data in HTML (HyperText Markup Language) format in the data transmission network 14. The data viewing program 42 has a graphical user interface that is explained in more detail below with the aid of FIG. 2.

The portable device 12 likewise contains a transmitting/receiving unit 52 that operates according to the Internet Protocol and receives data packets from the data transmission network 14 and transmits data packets into the data transmission network 14, for example to the personal computer 10 or to the telecommunication system service providing computer.

The transmitting/receiving unit 52 also contains a load registering unit that registers the load on the data transmission network 14. Because the portable device 12 is connected between the personal computer 10 and the service providing computer, the transmitting/receiving unit 52 will be able to restrict the transmission of data packets from the personal computer 10 to the service providing computer in the event of an overload threat. In other words, data packets which are transmitted to the portable device 12 from the service providing computer, which is to say from the network access unit or, as the case may be, from the gatekeeper, or which the portable device 12 transmits to the service providing computer are prioritized thereby.

A protocol unit 54 serves to execute a signaling protocol for transmitting voice data in data packets. The protocol unit 54 operates according to, for example, the H.225 and H.245 signaling protocols of the H.323 protocol family of the ITU-T. The protocol unit 54 also serves to forward the receive useful-data stream coming from the transmitting/receiving unit 52 to a useful-data stream/audio control unit 56. In the opposite direction, voice data coming from the useful-data stream/audio control unit 56 is forwarded to the transmitting/receiving unit 52 by the protocol unit 54, see arrows 58 and 60. The useful-data stream/audio control unit performs, for example, pulse code modulation according to the G.711 standard or voice coding according to the G.723.1 standard of the ITU.

The voice data is entered by the user TlnA into the portable device 12 with the aid of a headset 62 having a microphone. The headset 62 having a microphone is connected to the portable device 12 via a transmission link 64 by means of, for example, a lead or a radio transmission link or with the aid of an infrared transmission link. In another exemplary embodiment the portable device 12 contains, alternatively or in addition to the headset 62 having a microphone, a handsfree-talking facility provided by means of a microphone contained in the portable device 12 and by means of a loudspeaker contained in the portable device 12. The voice data coming from the data transmission network 14 is fed out on the headset 62 audibly for the user TlnA.

The portable device 12 furthermore contains a web service providing computer 66 (world wide web) which is referred to also as a web server and which is the partner program of the data viewing program 42 in terms of the configuration of the portable device 12. The web server 66 can be implemented in an integrated circuit.

The transmitting/receiving unit 52 forwards messages relating to settings on the portable device 12 to the service providing computer 66, see arrow 68. The service providing computer 66 then drives the protocol unit 54 or the useful-data stream/audio control unit 56 as a function of the received setting values, see arrows 70 and 72. In the opposite direction the service providing computer 66 is able to interrogate settings of the protocol unit 54 and of the control unit 56 and forward them to the personal computer 10 via the transmitting/receiving unit 52. The settings include, for example:
- the internet address of the portable device 12,
- the assignment of the personal computer 10 to the portable device 12 via the internet address of the personal computer 10,
- the internet address of the service providing computer, which is to say of the network access unit or, as the case may be, of the gatekeeper,
- an internet address and what is termed a port number for receiving the useful data stream, and
- the specification of a type of coding.

The portable device 12 does not, in the exemplary embodiment, contain an input device such as, for example, a keyboard; nor does it contain a display unit such as, for example, a monitor. The personal computer 10 does not contain a magnetic storage for storing volumes of data exceeding one megabyte, which is to say it does not contain a hard disk or similar storage facility.

FIG. 2 shows a monitor display 100 for the user TlnA when that user's portable device 12 is used. A graphics window 102 shown in the monitor 26 contains a title bar 104 in which is indicated the name of the data viewing program 43 used. The address of the service providing computer, in the exemplary embodiment the address http://hipath/opticlientweb, is displayed in a header line 106 located below the title bar 104.

Below the header line 106 are shown user lines 108, 110, and 112 for the user TlnA, for a user TlnB and for a user TlnC, and further user lines 114 not shown individually. The terminals of the users belonging to the user lines 108 to 114 are, for example, likewise connected to the same private branch exchange or to private branch exchanges within the same association of private branch exchanges. But user lines can also be shown for what are termed "external" users, which is to say for users not connected to the private branch exchange.

Each user line 108 to 114 contains a user name field, see for example the user name fields 116, 118 or, as the case may be, 120 for the user TlnA, TlnB, and TlnC. Each user line 108 to 114 furthermore contains a status field in which is displayed the status of the relevant user's portable device, see status fields 122, 124, and 126 for the user TlnA, TlnB or, as the case may be, TlnC. The user line of the user TlnA, which is to say of the user using the portable device 12 assigned to the personal computer 10, is shown highlighted, see double framing of the user line 108 in FIG. 2. It is assumed that the user TlnA has been called by a user TlnB and now wishes to consult with a user TlnC. The user TlnB was switched to the "hold" status, see status field 124. The user TlnC is called, see "call" status in the status field 126. The "consultation" status is displayed in the status field 122 for the portable device 12.

In its lower area the graphics window 102 also contains function keys 128 to 134 with the aid of which the features made available by the private branch exchange can be used. A function key 128 is assigned, for instance, to the feature "number redial" and a function key 130 to the feature "call redirection". A function key 134 serves to configure the portable device 12 and is as a rule used only when the portable device 12 is first powered on.

The invention claimed is:

1. A user-side device arrangement for a data transfer service, comprising:
   a first computer comprising
      a first storage unit in which program instructions can be stored,
      a first processor which executes the stored program instructions, and
      a signaling unit for implementing features of the data transfer service that interfaces with a private branch exchange,
      wherein the first computer is configured to process one or more application programs subjecting the first processor to a variable processing load; and
      an input device,
   a second computer operatively connected to the first computer via a data transmission network, the second computer configured according to information entered into the input device of the first computer, the second computer comprising
      a data processing unit that processes the data to be transferred or actually transferred within the scope of the data transfer service, wherein with the signaling unit and the data processing unit in respective first and second computers the second computer is operated substantially independently of the first computer, and
      a second storage unit and a second processor for use of the data processing unit, wherein the second computer further comprises a transmitting/receiving unit which receives data over the data transmission network and/or transmits data into the data transmission network, wherein the data transmission network operates according to an internet protocol, wherein the data comprises voice data and/or video data, wherein a quality indication of the voice data and/or video data is substantially determined by the second computer and is substantially independent of the variable processing load to which the first processor is subjected to when processing said one or more application programs,
   wherein the second computer is disposed between the first computer and a hub of the data transmission network, and wherein in an overload situation data sent to or received by the second computer has a priority over data sent to or received by the first computer.

2. The device arrangement according to claim 1, wherein the first computer further comprises a first operating system program, and the second computer further comprises a second operating system program.

3. The device arrangement according to claim 2, wherein the second computer further comprises a circuit operative without the involvement of an operating system program.

4. The device arrangement according to claim 1 wherein the second computer is housed outside the first computer.

5. The device arrangement according to claim 1, wherein the second computer contains a power supply unit operating independently of a power pack of the first computer.

6. The device arrangement according to claim 1, wherein the second computer is operatively connected to the power supply of a data transmission network.

7. The device arrangement according to claim 1, wherein the second computer provides the data transfer service when the first computer has been deactivated.

8. The device arrangement according to claim 1, wherein the second computer is contained in a portable device.

9. The device arrangement according to claim 1, wherein the first computer is a network computer which receives an application program over the data transmission network.

10. The device arrangement according to claim 1, wherein the first computer further comprises a transmitting/receiving unit which transmits and receives data packets over the data transmission network, wherein the data transmission network operates according to an internet protocol.

11. The device arrangement according to claim 10, wherein the first computer further comprises a setting unit which transmits a setting value to the transmitting/receiving unit of the first computer.

12. The device arrangement according to claim 11, wherein the signaling unit and/or the setting unit contains an interface to a data viewing program.

13. The device arrangement according to claim 1, wherein the internet protocol is transmitted according to a H.323 based protocol.

14. The device arrangement according to claim 1, wherein signaling messages are transmitted to the transmitting/receiving unit of the second computer according to a control protocol for transferring data in data packets, the control protocol selected from the group consisting of H.225, H.245, SIP.

15. The device arrangement according to claim 1, wherein the device arrangement is adapted to register an overload case on the data transmission network between the first computer and the second computer and wherein upon registry of the overload case, forwarding a data packet is given a priority.

16. A method for arranging a first computer and a second computer in a user-side device for a data transfer service, the method comprising:

configuring a first computer to process one or more application programs subjecting a processor of the first computer to a variable processing load; and coupling a second computer to the first computer via a data transmission network, the second computer configured according to information entered into an input device of the first computer; and operating the second computer to transmit and/or receive data over the data transmission network, wherein the data transmission network operates according to an internet protocol, wherein the data comprises voice data and/or video data, wherein a quality indication of the voice data and/or video data is substantially determined by the second computer, and the quality indication is substantially independent of the variable processing load to which the processor of the first computer is subjected to when processing said one or more application programs, wherein the second computer is disposed between the first computer and a hub of the data transmission network, and wherein in an overload situation data sent to or received by the second computer has a priority over data sent to or received by the first computer.

* * * * *